(12) United States Patent
Pellizzoni et al.

(10) Patent No.: US 8,107,429 B2
(45) Date of Patent: Jan. 31, 2012

(54) SYSTEM AND METHOD FOR PROTECTING PAYLOAD INFORMATION IN RADIO TRANSMISSION

(75) Inventors: Roberto Pellizzoni, Cantù (IT); Giacomo Mirelli, Carugate (IT); Mario Giovanni Frecassetti, Bergamo (IT)

(73) Assignee: Alcatel Lucent, Paris (FR)

( * ) Notice: Subject to any disclaimer, the term of this patent is extended or adjusted under 35 U.S.C. 154(b) by 650 days.

(21) Appl. No.: 12/331,122

(22) Filed: Dec. 9, 2008

(65) Prior Publication Data
US 2009/0185517 A1    Jul. 23, 2009

(30) Foreign Application Priority Data
Dec. 12, 2007  (EP) .................................... 07301662

(51) Int. Cl.
*H04L 12/56* (2006.01)
*H04L 12/28* (2006.01)
*H04N 7/26* (2006.01)

(52) U.S. Cl. .................. 370/329; 370/230.1; 370/352; 370/392; 370/473; 370/474; 375/241

(58) Field of Classification Search ........ 370/230.1–394, 370/395.71, 400–522; 375/240.01, 241–253; 714/114, E12.019; 348/469–473
See application file for complete search history.

(56) References Cited

U.S. PATENT DOCUMENTS

| | | | |
|---|---|---|---|
| 5,111,292 A | 5/1992 | Kuriacose et al. | |
| 5,289,276 A | 2/1994 | Siracusa et al. | |
| 6,813,259 B1 * | 11/2004 | Kumar et al. | 370/338 |
| 7,145,919 B2 * | 12/2006 | Krishnarajah et al. | 370/474 |
| 7,535,841 B1 * | 5/2009 | Beshai et al. | 370/230.1 |
| 7,624,333 B2 * | 11/2009 | Langner | 714/781 |
| 7,898,944 B2 * | 3/2011 | Bianchi et al. | 370/225 |
| 2003/0182610 A1 | 9/2003 | Bushmitch et al. | |
| 2008/0192774 A1 * | 8/2008 | Singh et al. | 370/473 |
| 2008/0209499 A1 * | 8/2008 | Ramesh et al. | 725/138 |

FOREIGN PATENT DOCUMENTS
EP    0 743 795 A2    11/1996

OTHER PUBLICATIONS
European Search Report.
* cited by examiner

*Primary Examiner* — Afsar M. Qureshi
(74) *Attorney, Agent, or Firm* — Fay Sharpe LLP

(57) ABSTRACT

System and method for improving the protecting radio channels in transmission, according to which the payload information of the signal to be transmitted is divided into a plurality of data portions of smaller size which are then grouped into packets and the packets are labeled based on a criterion from among a plurality of criteria, said criterion being indicative of a level of priority associated to said packets. The packets are subsequently radio transmitted in accordance with their level of priority indicated by their associated label.

10 Claims, 3 Drawing Sheets

SYSTEM AND METHOD FOR PROTECTING PAYLOAD INFORMATION IN RADIO TRANSMISSION

The present invention relates to the field of radio communications. More particularly the invention relates to protecting payload information in radio transmission and is applicable to any and all wireless communication systems.

BACKGROUND OF THE INVENTION

As it is well known, protection in radio transmission is an important task to be taken into account. Protection in the context of the present invention refers to any action or means employed in order to ensure a non-faulty transmission or to reduce the effects of an eventual fault. In general, when a fault is detected in a link during transmission, the transmission is maintained active by putting a second link, the protection link, in operation. Various types of protection in radio environment are known. Two of such types which are related directly to radio aspects of transmission are briefly discussed below.

The first type of such protection is related to protection against hardware failure. This protection is currently performed by means of a method known as Hot Stand-By configuration. Hot Stand-By protection is based on the presence of a spare transceiver that is put into operation when the main transceiver is subject to a hardware failure. In such case, the traffic is switched from the main transceiver to the spare transceiver.

The second type of protection is related to propagation effects such as effects caused by rain, fog, selective fading and the like. This type of protection is currently performed by means of frequency diversity or space diversity or the like.

DESCRIPTION OF THE INVENTION

The above known solution suffer from certain drawbacks.

The problem with the Hot Stand-By solution is that the switching from the main transceiver to the spare transceiver is usually non-hitless, that is, it may become affected by errors.

Furthermore, both the known solutions suffer from the drawback of providing protection based on the redundancy of the radio channels due to the fact that by using these solutions, what is protected is the radio channel itself without regard to any criterion as to the type of transported traffic which needs to be protected. Such transported traffic may be different from one channel to another and different criteria may become required for their respective protection.

The known solutions therefore are not capable of differentiating the protection to be applied to channels according to the specific types of information transmitted or interfaces or services transported. This problem gives rise to an inefficient use of network resources. The problem becomes still more important where data is transmitted using packets where different packets may transmit different types of information which in turn would need different levels of protection, for example due to different requirements of quality of service.

The present invention aims at providing a solution so as to overcome at least some of the above drawbacks.

The above objective is achieved by using the solution proposed by the present invention according to which the payload information of a channel is divided into a plurality of data portions of smaller size in comparison to the size of the original payload. The data portions are then inserted into packets so as to be subsequently radio transmitted.

According to the invention, the packets are formed in accordance with a criterion of priority in such a manner that data portions which need to be protected first or at a higher level with respect to other data portions are grouped into packets that are labeled accordingly. Priority may be assigned as a function of the type of information to be transmitted and/or the nature of communication and it may be assigned in any convenient manner known to a person skilled in the art. Some non-limiting examples are: a TDM voice traffic may be given higher priority than data traffic; or within an incoming native Ethernet data stream, classification rules may be defined in order to establish priority such as for example the standard well known rules based on 802.1p and/or Diff Serv; or the requirement of providing a higher level of protection to certain customers in exchange of a higher cost of service provided to them.

For transmission of such packets, suitable radio channels are selected and the packets carrying the payload information to be protected are transmitted according to their level of priority which is identified by means of a label on the packets.

Accordingly, one object of the present invention is that of providing a method of protecting payload information in radio transmission comprising the steps of:
  dividing the payload into a plurality of data portions,
  grouping a data portion so as to form a packet,
  selecting an available radio channel, suitable for incorporating said packet in said radio channel,
  incorporating at least one packet in the selected radio channel
  transmitting, said selected radio channel with said at least one packet incorporated in the radio channel
wherein the step of grouping a data portion so as to form a packet comprises the steps of:
  identifying data portions according to a criterion of protection selected from a plurality of criteria of protection,
  grouping data portions identified as having the same criterion in a packet,
  labeling said packet containing data portions with the same criterion said labeling being indicative of a priority level for the packet, and
wherein the step of incorporating at least one packet in the selected radio channel is performed such that the packets are incorporated in the selected channel according to said priority level.

Another object of the present invention is that of providing a packet processor for protected radio transmission of a payload information comprising:
  means for dividing a payload into a plurality of data portions and for grouping a data portion so as to form a packet,
  means for identifying data portions according to a criterion of protection selected from a plurality of criteria of protection,
  means for grouping data portions identified as having the same criterion in a packet,
  means for labeling said packet containing data portions with the same criterion said labeling being indicative of a priority level for the packet.

According to an aspect of the invention, the packet processor comprises a framer adapted for:
  identifying data portions according to a criterion of protection selected from a plurality of criteria of protection,
  grouping data portions identified as having the same criterion in a packet,
  labeling said packet containing data portions with the same criterion said labeling being indicative of a priority level for the packet.

According to another aspect of the invention the packet processor comprises a packet builder for adding a header to said packet.

According to a further aspect of the invention the packet builder is adapted for labeling said packet containing data portions with the same criterion said labeling being indicative of a priority level for the packet.

A further object of the invention is that of providing a transmitter for protected radio transmission of a payload information comprising a packet processor according to the invention.

According to still another aspect of the invention, the transmitter comprises:
- a packet aggregator for multiplexing a plurality of packets formed by said packet processor to form a multiplexed packet stream,
- a packet allocator for allocating at least one packet from said multiplexed packet stream to one or more available radio channels wherein packets are incorporated in the channel according to said priority level,
- a transmitter unit for radio transmitting said available radio channel with said packet allocated to said radio channel.

A still further object of the invention is that of providing a programmable device comprising storage means with a software program recorded thereon, the software program comprising instructions which, when executed on the device, cause the device to carry out the steps of the method of the invention.

These and further features and advantages of the present invention are described in more detail in the following description as well as in the claims with the aid of the accompanying drawings.

EXAMPLES OF PREFERRED EMBODIMENTS

In order to carry out the solution of the present invention, a specific procedure is employed which in general terms comprises the steps of dividing a payload into a plurality of data portions, grouping a data portion so as to form a packet, selecting an available radio channel, suitable for incorporating said packet in said radio channel, incorporating at least one packet in the selected radio channel and transmitting said selected radio channel with said at least one packet incorporated in the radio channel. This specific procedure is subject-matter of a separate European patent application number 07301243.7, filed on 17 Jul. 2007 in the name of the applicant/assignee. In order to better understand the solution proposed by the present invention, a description of the aforementioned specific procedure is provided hereinbelow. In the following, said procedure will be referred to as "packeting process".

The packeting process relates to transmitting payload information from a line interface through radio. The line interface may be of any known type such as for example PDH, SDH, ISDN or Ethernet. For the purpose of the following description a "generic" line interface is considered and discussed. By "generic" it is meant that certain characteristics which are necessary for the implementation of the solution of the present invention are common in all the known examples. Clearly, the various known line interfaces (such as the examples given above) may have different detailed structures. However from a general point of view, they all have a part intended for incorporating useful information, which is usually referred to as the payload. A payload is therefore considered to be a common characteristic among all the variants of line interfaces to which the solution of the present invention is applicable. Payloads may be incorporated in a frame, although this is not always the case, typically together with an additional section called "overhead" or "header" typically containing information on frame structure, source or destination addresses, etc which are all known features in the related art.

Figure 1:
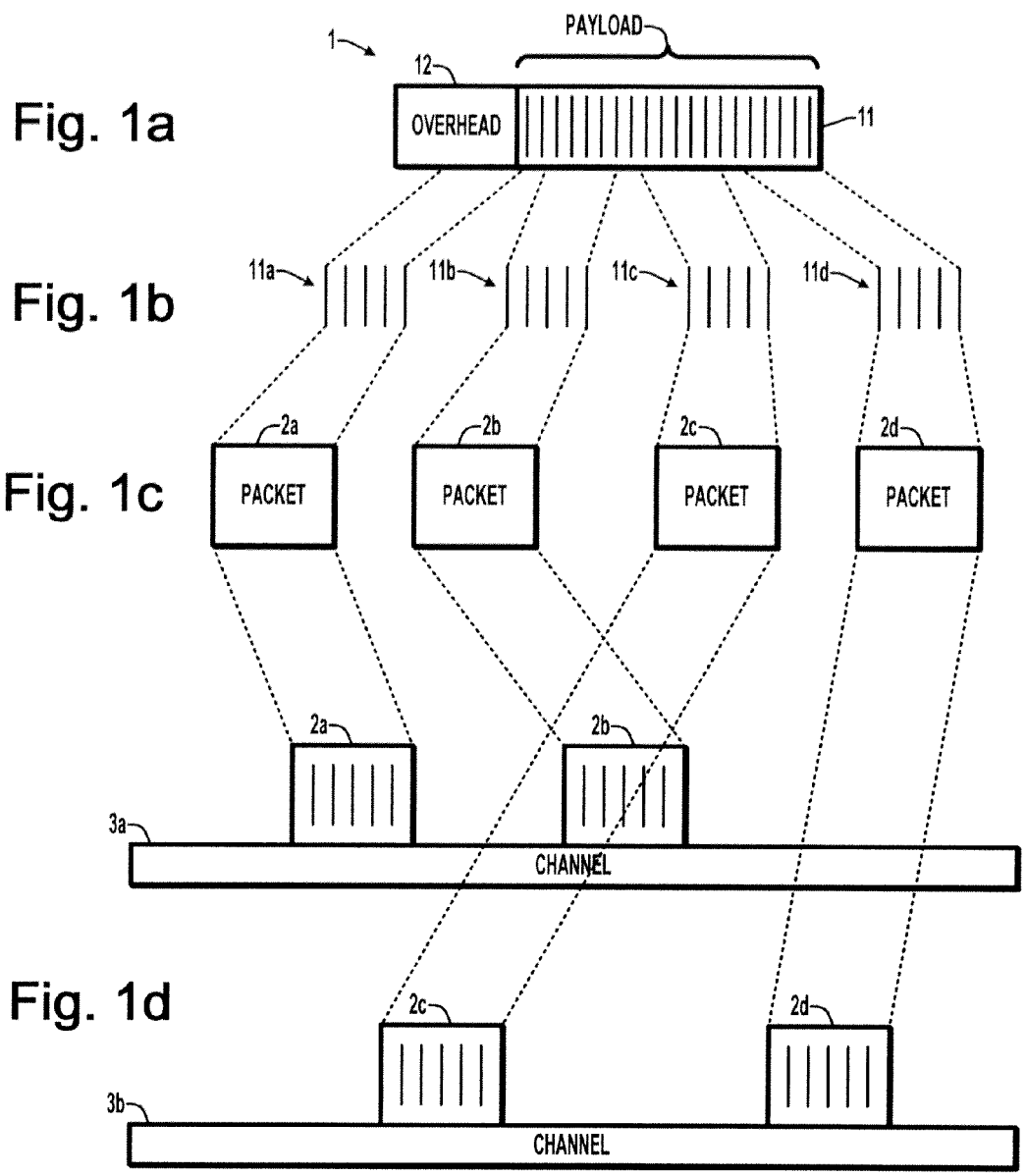
FIGS. 1a to 1d show schematic representations for an exemplary sequence of steps to be taken for implementing the solution of the present invention.

Referring now to FIG. 1a, there is shown a schematic diagram of a frame structure 1 having a payload 11 and an overhead 12. The payload 11 is shown to contain traffic information which may be of any known kind, such as voice or data. This is represented in FIG. 1a by a striped zone.

According to the packeting process, the payload is divided into a plurality of entities of smaller size. These entities of smaller size are represented schematically in FIG. 1b by reference numerals 11a, 11b, 11c and 11d. It can be appreciated from this figure that the content of theses entities of smaller size are in fact portions of the payload 11. These portions will be referred to hereinafter as "data portions".

In the next step, the data portions 11a-11d are grouped into packets. The packets are represented schematically in FIG. 1c by reference numerals 2a, 2b, 2c and 2d. In addition to the data portions, a packet is preferably provided with additional information as deemed required or appropriate for a specific use, such as for example information on source and destination, flags to designate the start and the end, information on the integrity of the contents, priority information, information on the type of payload and the like.

In order to be able to transmit the packets formed, a selection is made from available radio channels, thereby selecting one or more radio channels which are considered to be suitable for incorporating a packet formed as described above, with the eventual aim of transmitting said radio channel with the packet incorporated therein. For selecting such a channel, in addition to the requirement of availability, the size of a specific channel with respect to the amount and the size of the packets to be incorporated is also taken into account.

The packets are then incorporated in a suitable radio channel selected as described above. It is to be noted that packets may be incorporated into channels in any convenient number. For example, it may occur that all the packets 2a, 2b, 2c and 2d originating from a single payload 11 are incorporated in one single channel (not shown). Alternatively it may occur that some packets are incorporated in one selected channel and others are incorporated in another selected channel. This is shown schematically in FIG. 1d, wherein channel 3a has incorporated the packets 2a and 2b and channel 3b has incorporated packets 2c and 2d.

In order to transmit the radio channel with the packet incorporated therein, a modulation scheme appropriate for transmitting over the selected radio channel is preferably selected.

Figure 2:
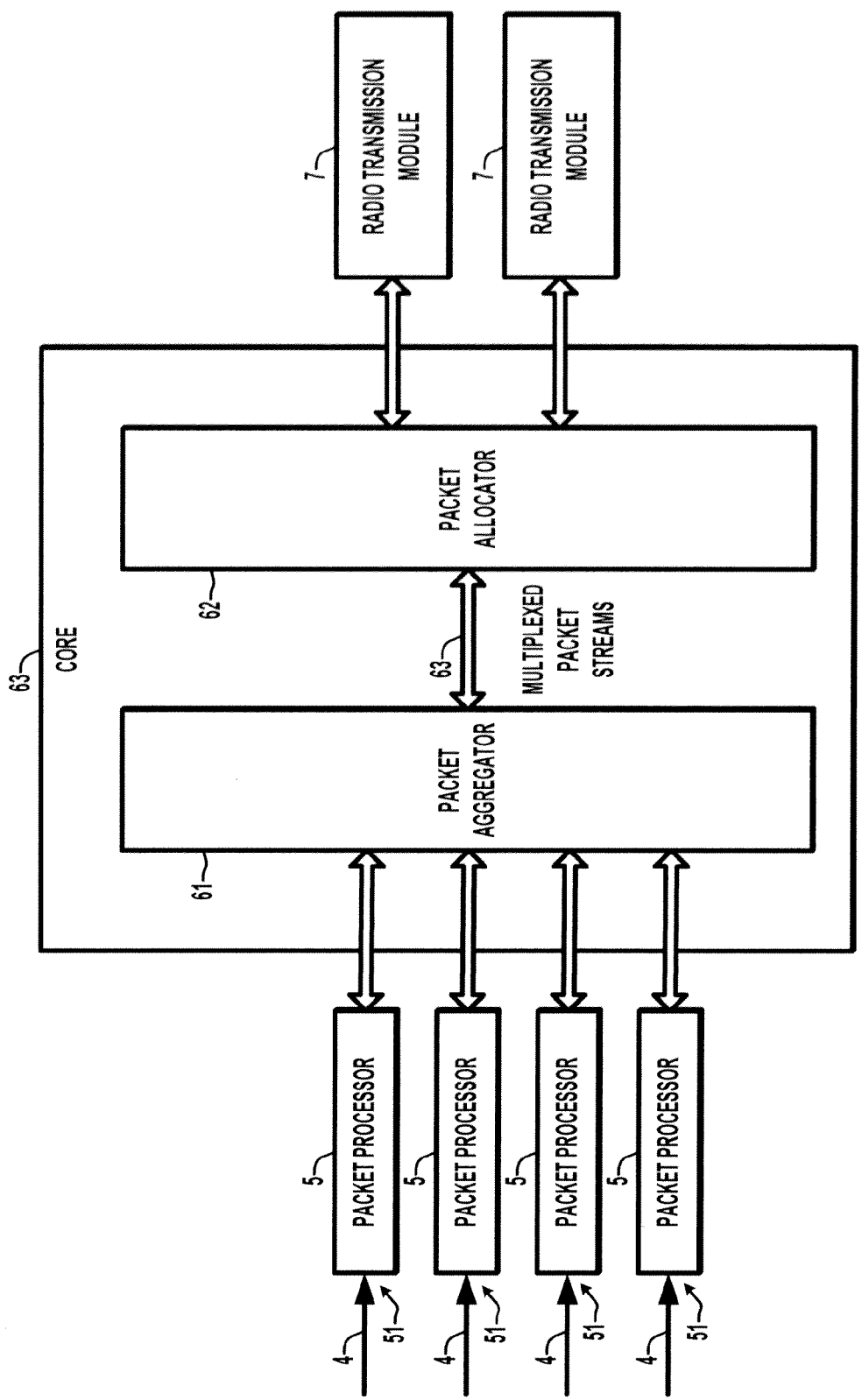
FIG. 2 is a schematic block diagram representation of an embodiment showing an exemplary general architecture useable according to the present invention.

Once the packets are incorporated in the selected channels and preferably an appropriate modulation scheme is chosen, said radio channel is transmitted having said packet or packets incorporated therein, based on said modulation scheme. FIG. 2 is a schematic representation of a general architecture of modules used for carrying out the packeting process. It is to be noted that this representation is simplified in order to only show the modules which are relevant for understanding the present description and is not to be interpreted in a limitative manner. Those skilled in the art would recognize that the architecture may, in practice, include other parts and units which are not relevant for the understanding of the present description and thus are not shown.

FIG. 2 shows a transmitter including, a plurality of line interfaces 4 which may vary in number according to the specific needs. The interfaces may be of continuous bit rate nature (CBR), or non-continuous bit rate nature (NCBR). Examples of CBR are PDH, SDH, SONET and an example of NCBR is Ethernet.

The line interfaces 4 are coupled to respective packet processors 5. Packet processors may be located within respective access modules (not shown in the figure), however this is optional. An access module performs the function of interfacing in order to provide access from a line interface 4 to the central unit or core 6, of the system. The type of access module is chosen in accordance with the type of line interface to which it is connected; for example, an SDH line interface is to be connected to an access module adapted to receive and process SDH payloads. Examples of such access modules are modules to interface with modes such as 8xE1, 16xE1, 32xE1, DS1, E3, SDH, ATM, Optical Gigabit Ethernet, among others known in the related art.

Irrespective of whether a packet processor 5 is inside or outside an access module, the packet processor 5 is located at a position suitable to receive the incoming data upstream of the core 6 of the system. A packet processor 5 is, in transmission mode, in charge of forming packets. This is done by first dividing the payload, received at an input 51 thereof from the respective line interface 4 (after having passed through a corresponding access module), into data portions of smaller size (as compared to the size of the payload itself). Next the packet processor 5, groups said data portions into packets. The operation and structure of the packet processor 5 will be described in detail further below with reference to FIG. 3.

In this manner, packets are formed in the packet processors 5 and are then input into the core 6 which is in charge of further processing the received packets.

Core 6 comprises a packet aggregator 61 and a packet allocator 62 as show in FIG. 2. Here again the representation of the core 6 is simplified in order to only show the units which are relevant for understanding the present description and is not to be interpreted in a limitative manner. Those skilled in the art would recognize that the core may, in practice, include other parts and units which are not relevant for the understanding of the present description and thus are not shown.

In transmission mode, the packet aggregator 61 receives packets from one or a plurality of packet processors (four in the figure) and multiplexes the received packets into one multiplexed packet stream 63. This is done because in practice, handling of a packet stream is performed in a more flexible way as the stream could be easily divided by the packet allocator 62 into frames which are then sent to radio plug-ins in one or more directions. The packet aggregator 61 may be connected to any suitable number of packet allocators 62 or packet processors 5 depending on the number of ports available on the packet aggregator 61.

A typical example of a packet aggregator is a simple Ethernet switch.

The multiplexed packet stream 63 is then input into the packet allocator 62. In transmission mode, the packet allocator 62 is in charge of first selecting one or more suitable radio channel(s), and once the selection is done, allocating a packet from said received multiplexed packet stream 63 to a suitable radio channel selected.

According to the present invention, the packet allocator 62 receives the packet streams 63 containing packets which are already labeled by the packet processor 5 according to a priority criterion, divides the packet stream into packets and groups the packets having the same priority criterion in order to form suitable radio frames to be transmitted through air over the available.

The process of building radio frames may be according to the known solutions in the related art. This process may include adding a suitable error correction code and other known measures.

For a radio channel to be considered suitable for selection, the main conditions are that the channel must be available and it must have a size suitable for incorporating at least one packet therein. Other criteria may also be applied according to specific use.

A typical device for performing the allocation operation may be an ASIC or an FPGA or a combination thereof.

The channels having packets incorporated therein are then input into radio transmission modules 7 from which they are subsequently transmitted through wireless transmission.

The wireless transmission of the channels is done by using a modulation scheme. Preferably a modulation scheme is selected which is more appropriate for such transmission. One criterion for considering a modulation scheme as appropriate is based on taking into account the link budget of transmission. A link budget relates to considerations that correspond to the gains or losses in transmission from a transmitter end to a receiver end for which known methods of calculation exist. The modulation scheme may be selected by the packet allocator 62 or the radio transmission module 7.

The radio channels themselves could be different in size and number.

Figure 3:
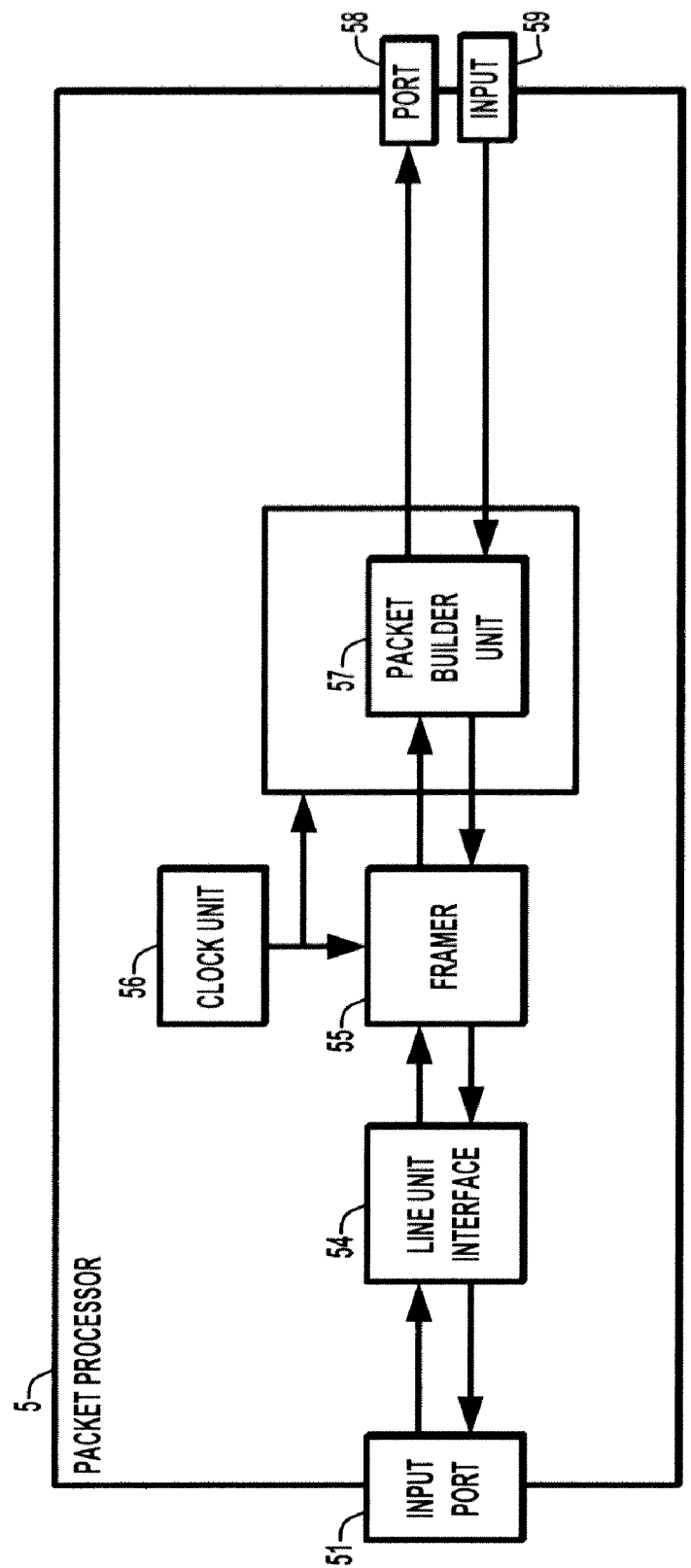
FIG. 3 is a schematic block diagram representation of an exemplary module for forming packets according to the present invention.

FIG. 3 is a schematic representation of a packet processor 5 according to the present invention. Here also it is to be noted that this representation is simplified in order to only show the elements of the packet processor 5 which are relevant for understanding of the present description and it is not to be interpreted in a limitative manner.

As seen in the figure, the packet processor 5 has a line unit interface 54 which is in charge of receiving the line interface payload at the input port 51, and performing electrical adaptation of the same. By electrical adaptation it is meant performing routine operations such as signal level or impedance adjustments for adapting the incoming signal for further stages of processing.

The payload is then input from the line unit interface 54 into a framer 55. In this unit, the payload is divided into data portions of smaller size and grouped into packets according to a priority criterion.

In addition to the above, the following functions are performed by the framer 55 in the context of the present invention.
    identifying data portions according to a criterion of protection selected from a plurality of criteria of protection,
    grouping data portions identified as having the same criterion in a packet
    labeling said packet containing data portions with the same criterion said labeling being indicative of a priority level for the packet.

The framer 55 is driven by a clock signal provided by the clock unit 56. The operation of the framer may be performed, for example, by an FPGA or an ASIC.

The packets so formed and labeled do not have overhead at this stage. Therefore, in order to prepare a packet suitable for a standard or conventionally accepted transmission they are input from the framer 55 into a packet builder unit 57 where an overhead is added to the packet, thus making it suitable for transmission. The packet builder unit 57 could be any known device suitable for the intended use such as for example one known as SAToP/MEF8 (SAToP meaning 'Structure-Agnostic TDM over Packet' which is a known protocol and MEF8 being an Implementation Agreement for the Emulation of PDH Circuits over Metro Ethernet Networks) for a PDH related packet processor.

In an alternative embodiment, the labeling may be performed by the packet builder unit 57 via input 59.

The packets, having overhead incorporated thereto, are output at a port 58 and are input into the packet aggregator 61 and next into the packet allocator 62. The procedure followed in the packet aggregator 61 and the packet allocator 62 is as already described further above in relation to FIG. 2. In particular, the packet allocator 62 receives the packets streams containing packets which are already labeled according to a priority criterion, divides the packet stream into packets and groups the packets having the same priority criterion in order to form suitable radio frames to be transmitted through air over the available channel. The transmission of packets is therefore performed according to their respective priority criterion indicated by their label, for example, the packets with a label indicative of a high priority are transmitted before the packets having a label indicative of a low priority. As already discussed together with examples provided above, the criteria for establishing priority may vary in accordance to practical requirements of the particular application.

The framer 55 may therefore be programmed to be enabled to distinguish the levels of priority.

The arrangements shown and discussed in the above embodiment of the present invention may preferably be bidirectional. That is to say, the invention may provide also for the possibility of receiving, radio channels carrying packets of payloads incorporated therein according to a protection criterion. Channels are received at a receiver end and processed further in order to extract the packets from the received channels. Then payloads are formed from the extracted packets and provided to the various corresponding interfaces at the output of the receiver.

As seen from the foregoing, the solution proposed by the present invention provides the possibility of establishing a protection scheme in a more efficient manner because the determination as to what information is to be protected, or to be protected first, is performed by having regard to the type of signal in the packets and disregarding the type of the physical line interface itself. This eliminates the need to protect an entire channel where the channel does not need to be protected entirely. Another advantage is that by using the solution of the present invention, the known concept of n+1 protection can be modulated among n+m for certain interfaces/services, without any extra cost.

In other words, in current n+1 protection schemes applied to radio links, there are n active channels and 1 spare shared by the rest of the n channels. If one active channel suffers performance degradation, for instance due to propagation, this channel is entirely switched to the spare channel. In this situation, there is no further protection available for the remaining active channels as the spare channel is already occupied.

By using the solution of the present invention, only the affected part of the traffic in the faulty channel is switched to another channel having available capacity. The latter channel may be any one of the other active channels having the required capacity available without a need of using an additional spare channel. In this way the faulty channel decreases its capacity, through adaptive modulation algorithms, and the excess traffic is allocated to one or more of the other channels.

Furthermore, an arrangement of n channel which are not strictly equal to each other is also made feasible in order to provide a protected system. Therefore, the protection may be dimensioned, with respect to the radio channel, as a non integer concept.

Another advantageous possibility provided by the present invention is that in case of hardware failure or problems in propagation giving rise to a failure in a channel, the traffic may be carried over others channels as packets to be protected may be allocated to available channels.

It is to be noted that the use of the solution of the present invention does not impede the use of other known protection methods, for example Hot Stand-By, if deemed necessary.

A further advantage of the present invention is that the need for a specific "protection channel" as is the case in the conventional systems, is eliminated as the protection is performed on portions of the channels to be protected which are selected according to the quality of protection desired where these portion are preferably not of the same size of the channel under protection but of a smaller size.

It is to be noted that where possible, the elements used for carrying out the invention can, where appropriate, include blocks which can be hardware devices, software modules or combination of hardware devices and software modules.

The method of the invention can be advantageously implemented on a Network Element, including means like an Application Specific Integrated Circuit (ASIC), a Field Programmable Gate Array (FPGA) and/or a microprocessor, and in a preferred embodiment through or together with a software process or software module including one or more software programs (computer programs) written in e.g. Very high speed integrated circuit Hardware Description Language (VHDL) or C or C++ or Java or another language, by one or more VHDL processes or C routines. Therefore, it is understood that the scope of the protection is extended to such a program and in addition to a computer readable means having a message therein, such computer readable storage means containing program code means for the implementation of one or more steps of the method, when this program is run on a computer, an ASIC, an FPGA or a microprocessor.

It is to be noted that the system (packet processor, transmitter, device) of the invention can be used to practice another and materially different method and is not be construed to be limited to practicing only the method as claimed in the present invention. Likewise, the method of the invention can be practiced by another materially different system, device, apparatus or equipment than the one(s) claimed in the present invention as long as these are capable of performing the method of the invention.

It is also to be noted that the order of the steps of the method of the invention as described and recited in the corresponding claims is not limited to the order as presented and described and may vary without departing from the scope of the invention.

The invention claimed is:

1. A method of protecting payload information in radio transmission comprising the steps of:
   dividing the payload into a plurality of data portions,
   grouping a data portion so as to form a packet,
   selecting an available radio channel, suitable for incorporating said packet in said radio channel, incorporating at least one packet in the selected radio channel transmitting, said selected radio channel with said at least one packet incorporated in the radio channel wherein the step of grouping a data portion so as to form a packet comprises the steps of:

identifying data portions according to a criterion of protection selected from a plurality of criteria of protection, grouping data portions identified as having the same criterion in a packet, labeling said packet containing data portions with the same criterion said labeling being indicative of a priority level for the packet, and wherein the step of incorporating at least one packet in the selected radio channel is performed such that the packets are incorporated in the selected channel according to said priority level.

2. A method according to claim 1 further comprising the step of multiplexing the formed packets into a multiplexed packet stream.

3. A method according to claim 1, wherein the radio channels are different in size and/or number.

4. A method according to claim 1, wherein the criterion of protection is based on the type of information and/or the nature of communication.

5. A method according to claim 1 wherein a programmable device comprises storage means with a software program recorded thereon, the software program comprising instructions for being executed on the device.

6. A packet processor for protected radio transmission of a payload information comprising:

means for dividing a payload into a plurality of data portions and for grouping a data portion so as to form a packet, means for identifying data portions according to a criterion of protection selected from a plurality of criteria of protection, means for grouping data portions identified as having the same criterion in a packet, means for labeling said packet containing data portions with the same criterion said labeling being indicative of a priority level for the packet, and a framer adapted for identifying data portions according to a criterion of protection selected from a plurality of criteria of protection, grouping data portions identified as having the same criterion in a packet, and labeling said packet containing data portions with the same criterion said labeling being indicative of a priority level for the packet.

7. A packet processor according to claim 6 further comprising a packet builder for adding a header to said packet.

8. A packet processor according to claim 7 wherein the packet builder is adapted for labeling said packet containing data portions with the same criterion said labeling being indicative of a priority level for the packet.

9. A packet processor according to claim 6 included in a transmitter for protected radio transmission of a payload information.

10. A transmitter according to claim 9 further comprising:

a packet aggregator for multiplexing a plurality of packets formed by said packet processor to form a multiplexed packet stream, a packet allocator for allocating at least one packet from said multiplexed packet stream to one or more available radio channels wherein packets are incorporated in the channel according to said priority level, a radio transmitter module for radio transmitting said available radio channel with said packet allocated to said radio channel.

* * * * *